United States Patent [19]
Morlock

[11] Patent Number: 6,069,333
[45] Date of Patent: May 30, 2000

[54] METHOD AND SYSTEM FOR WELDING RAILROAD RAILS

[75] Inventor: Michael J. Morlock, Cleveland Hts., Ohio

[73] Assignee: Lincoln Global, Inc., Cleveland, Ohio

[21] Appl. No.: 09/167,463

[22] Filed: Oct. 7, 1998

Related U.S. Application Data

[63] Continuation-in-part of application No. 08/802,935, Feb. 21, 1997, Pat. No. 5,877,468.

[51] Int. Cl.$^7$ ..................................................... B23K 9/035
[52] U.S. Cl. ....................... 219/54; 219/137 R; 238/164
[58] Field of Search .................................. 219/54, 137 R, 219/160, 73; 228/186; 238/164; 428/577, 599, 600, 602; 30/353, 346, 346.5

[56] References Cited

U.S. PATENT DOCUMENTS

| | | |
|---|---|---|
| 3,192,356 | 6/1965 | Shurbsall . |
| 3,308,266 | 3/1967 | Adams . |
| 4,187,410 | 2/1980 | Eroshkin et al. . |
| 4,429,207 | 1/1984 | Devletian et al. . |
| 4,539,464 | 9/1985 | Sindel ................................. 219/137 R |
| 4,686,341 | 8/1987 | Nomura et al. . |
| 4,841,116 | 6/1989 | Kimura et al. . |
| 5,175,405 | 12/1992 | Karimine et al. . |
| 5,605,283 | 2/1997 | Lahnsteiner et al. . |
| 5,773,779 | 6/1998 | Morlock . |

FOREIGN PATENT DOCUMENTS

| | | |
|---|---|---|
| 0 545 336 | 6/1993 | European Pat. Off. . |
| 2 703 701 | 10/1994 | France . |
| 437707 | 11/1926 | Germany . |
| 1191922 | 4/1965 | Germany . |
| 678 538 | 9/1991 | Switzerland . |
| 87/01982 | 4/1987 | WIPO . |

*Primary Examiner*—Clifford C. Shaw
*Attorney, Agent, or Firm*—Vickers, Daniels & Young

[57] ABSTRACT

A method of gas shielded arc welding steel railroad rails spaced from each other to define a longitudinal gap comprises the steps of providing an elongated steel barrier plate across the gap at the bottom of the spaced rails, and filling gap above the barrier plate with a molten steel from an advancing filler metal electrode by a gas shielded electric arc welding process. The barrier plate has a central portion received in the gap and longitudinally extending recesses laterally outwardly adjacent to the central portion and which underlie the bottoms of the rails at the bottom of the gap.

61 Claims, 13 Drawing Sheets

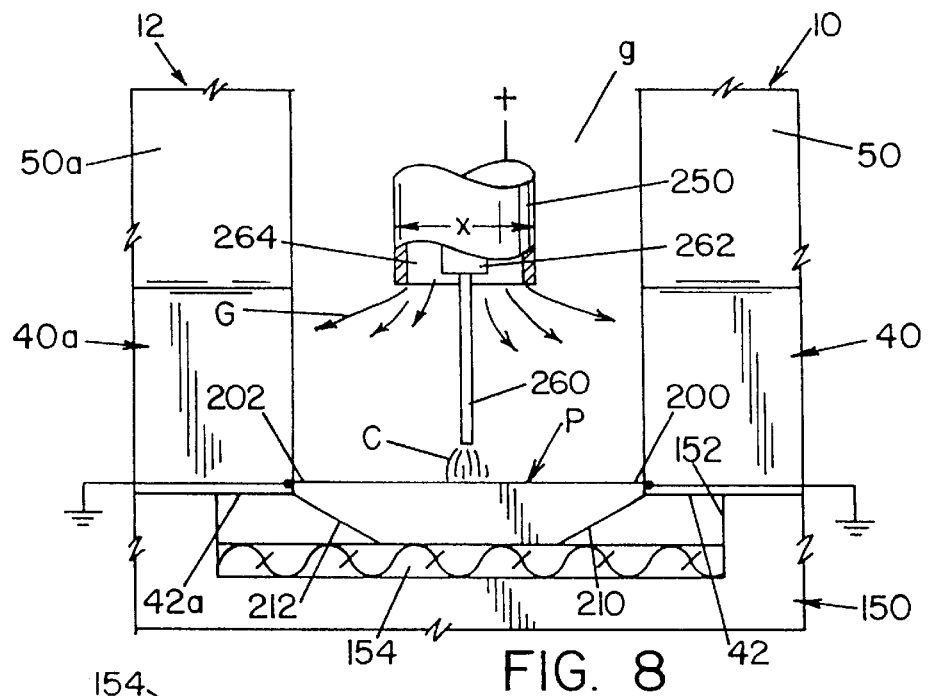
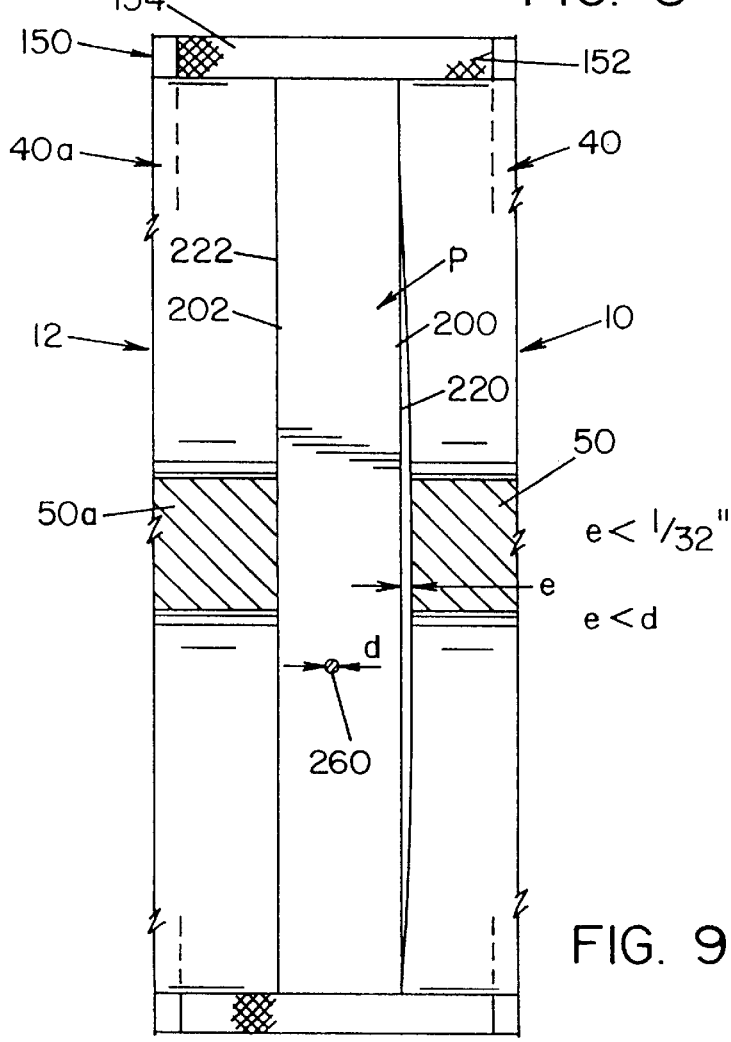
FIG. 8
FIG. 9

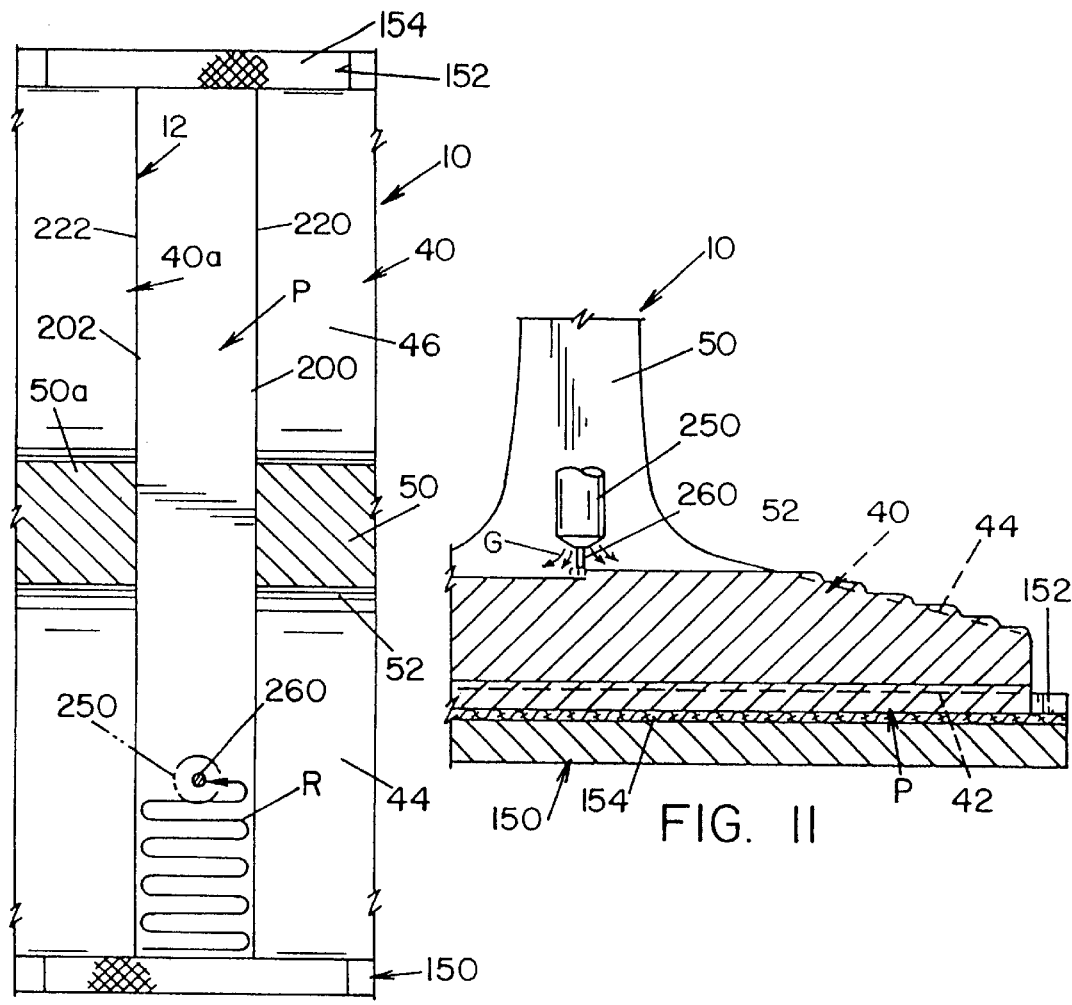
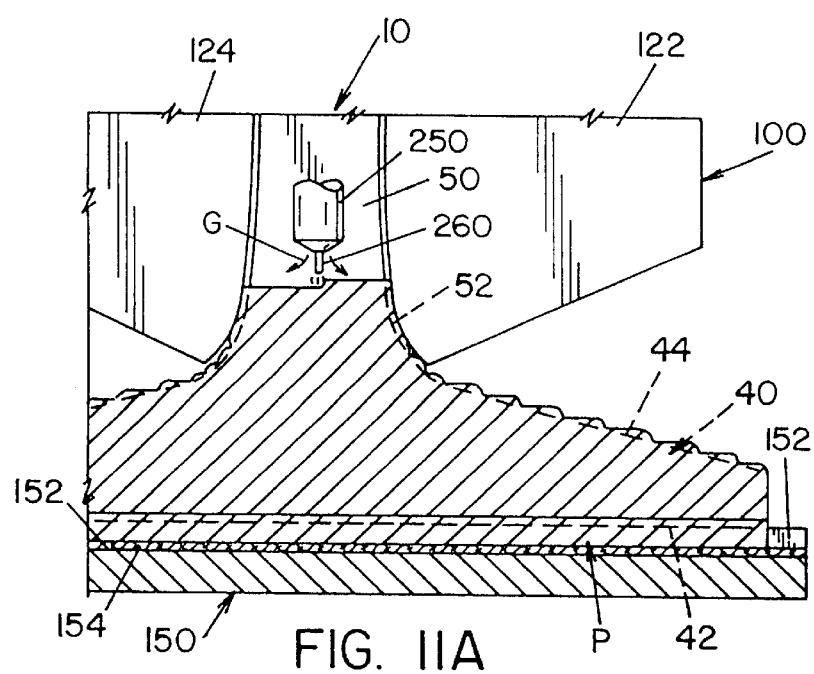

METHOD AND SYSTEM FOR WELDING RAILROAD RAILS

This application is a continuation-in-part of application Ser. No. 802,935 filed Feb. 21, 1997, now U.S. Pat. No. 5,877,468, issued Mar. 2, 1998.

The present invention relates to a method and system for welding the spaced ends of rails and more particularly welding two spaced railroad rails in the field by an arc welding process.

INCORPORATION BY REFERENCE

Through the years, a tremendous amount of effort have been devoted to joining spaced railroad rails by some type of butt welding process. Such efforts have generally proven costly and unsuccessful, due to limitations of the processes used, the required time for accomplishing the welding process, the cost of performing the welding process and/or the inability to obtain successful, long-lasting joints. In Devletian U.S Pat. No. 4,429,207, the most common electric arc welding process is illustrated wherein the electroslag welding procedure is used to fill the gaps between spaced railroad rails in the field. This process involves filling the gap between the rails with a pool of molten metal covered by an appropriate slag. To prevent the mass of molten metal from flowing from the gap between the rails, side molds and a bottom member are provided that creates a large protrusion of metal below the rails and extending from the actual gap. This prior patent illustrates a modified electroslag welding (ESW) technique which can be used in the field, where the rails cannot be turned upside down for normal welding. The advantage of electroslag welding over the normal thermite technique normally-used today are explained. In this disclosure, the thermite process is revealed to have substantial deficiencies, which are known to result in numerous failures in the field. This patent is incorporated by reference herein to describe the electroslag welding process even though the process has been abandoned as a practical process because of its obvious inefficiencies and inability to obtain uniform and successful welds in the field. Indeed, this process must deal with large masses of molten metal which presents problems in the field.

As an alleged advantage over the electroslag process, the combination of the electroslag technique and the gas shielded arc welding technique is disclosed in Karimine U.S. Pat. No. 5,175,405. This patent employs an automatic welding process for butt welding the spaced ends of railroad rails using a gas shielded arc welding process in combination with an electroslag process. The deficiencies of the normally-used thermite welding technique and the previously attempted enclosed arc welding technique are discussed in detail. As indicated, the thermite technique produces joints which have an unacceptably high failure rate; however, because of the economics, the time and inability to obtain an arc welding process of success, this thermite process is still the process of choice in the field. A disadvantage of the continuous arc welding technique discussed, as in this patent, is the inability to start the arc and the need for starting and stopping the arc as the welding process is performed. To overcome some of these disadvantages, this patent discussed the use of a submerged arc process at the bottom portion of the gap between the rails to start positively the welding process for subsequent and continuous arc welding. Karimine U.S. Pat. No. 5,175,405 is incorporated by reference herein to disclose the deficiencies of the thermite process, the enclosed arc welding technique and the submerged arc technique, all of which have been attempted and have not been successful in the field. The solution suggested by Karimine U.S. Pat. No. 5,175,405 is the use of a gas shielded arc welding technique in combination with an electroslag welding process wherein the gas shielded arc welding technique is used at the base of the gap to overcome the disadvantages of the previous attempts to use total electroslag welding. However, this process of using a gas shielded arc at the bottom of a gap could not be successful in the field due to the fact that there is no technique that will ensure accurate starting and depositing the first layer of the filler metal at the bottom of the gap.

The two patents incorporated by reference illustrate the deficiencies of the prior art to which the present invention is directed wherein a combination of various types of arc welding processes have been attempted without success. Consequently, the admittedly deficient thermite process is the only process used extensively for providing molten metal between the spaced rails for joining such rails in the field.

BACKGROUND OF THE INVENTION

Railroad rails must be installed and repaired by joining ends of the rails while they are in use or assembled for use in the field. The joining process results in a joint between the rails which has a high strength, can be adjusted metallurgically, will not crack and can be economically formed in a very short time. As a criteria for such welding process, the process must be performed in substantially less than 45 minutes or such process will cause a delay or rerouting of train traffic. Two processes are now used for joining the rails in the field. The first process is the thermite technique wherein the spaced rails are surrounded by an appropriate sand mold and steel is melted and poured into the mold to fill the gap between the spaced rails.' As the molten metal solidifies, the rails are joined; however, this process, which is universally used, has a failure rate that has been reported to be as high as 75%. In addition, the rails must be melted by the molten steel poured into the gaps between the rails. This melting requirement is not consistently met and also contributes to the failure of the joints produced in the field by the thermite process. To drastically decrease the deficiencies of the universally used thermite process, wherein steel is cast into the gaps between the rails, the ends of the rails may be joined by a flash butt welding process where the ends of the rails are driven together by tremendously high forces while electricity is passed between the rails. This causes the ends of the rails to become molten and pressure welded together. This process drastically reduces the failure rate of the joint to less than 10%. However, the flash butt welding process is best performed on rails in a manufacturing facility where the rails are not fixed on ties and can be forced together by stationary hydraulic equipment. To overcome the disadvantage of the universally used thermite process, the flash butt welding process has been modified for use in the field. However, the time for the welding process is substantially higher than the thermite process, since the rails must be stretched during the hydraulic forcing step, which step requires disconnecting one or both of the rails from the ties. This manual procedure must be reversed after the welding process has occurred, which is extremely time consuming.

Flash butt welding of rails consumes a portion of the rails which causes difficulties after the welding process has been completed. Also, sections of rails may have to be spliced into the rail to provide the necessary rail material for the weld.

In addition, it is deficient to transport the hydraulic equipment needed to create the tremendous pressure between the rails to remote locations as required in the field. The butt welding process also produces a flash around the periphery of the joined rails which must be sheared off and then ground to allow a smooth operation and also to prevent stress concentrations in the joint during use. Even though the flash butt welding process drastically reduces the rate of failure of the joints made in the field, the thermite process is still used because it can be done rapidly by merely putting a mold around the gap between the spaced rails. The process does not require large hydraulic equipment and is relatively inexpensive. The failure rate is addressed by again performing the thermite process when a joint has failed. In doing this, a large section of the rail must be cut and a new section of rail is inserted in the open area. Consequently, a failed thermite joint normally results in the need for two replacement thermite joints, with their propensity for failure. As can be seen, even though the thermite process is universally used, there is a substantial need for some process which will join the rails in the field, which process has a low failure rate, but has the advantages associated with the thermite process. This need has existed for many years. Arc welding processes have been tried periodically, such as electroslag, continuous arc welding and submerged arc welding and combinations thereof. None of these processes has been successful because they use impractically large equipment, take an unacceptably long time to weld and finish grind, and have not resulted in acceptable failure rates. The arc welding process, especially in the lower part of the gap between the rails, has been inconsistent. In addition, these prior attempts to use arc welding for joining the ends of spaced railroad rails were expensive, required complex equipment and demanded a substantial time to prepare for the welding process and actually performing the welding process. Such time is not available in field welding of rails.

THE PRESENT INVENTION

The present invention relates to a method and system for using gas shielded arc welding to join the spaced ends of railroad rails in the field, which method and system result in an economical, rapid and mechanically and metallurgically sound technique.

Railroad rails have a somewhat standard cross-sectional shape involving a lower base with a support bottom, which bottom is relatively wide to allow the rail to be placed in a stable position on spaced ties. Above the base is a vertically extending web that merges into an upper wheel-engaging head. This head is often hardened to provide better wear resistance as the wheels of the train roll over the rails. Hardness in the head area is especially important in curved track sections since there is a slipping action between the wheels and the rails due to the solid axle construction between transversely spaced railroad wheels. In addition, the rails must have a smooth head to prevent vibration of cars passing over the rails. This need to reduce vibration has caused a substantial increase in the desire to actually butt weld the rails in high speed, high weight rail systems. In the distant past, the rails were not welded together, which created the characteristic vibration of trains passing over the rails. With the advent of the high speed, high weight and high tech railway systems, the rails must be joined together as a continuous rail which has increased the demand for joining processes performed in the field to which the present invention is an improvement. The invention overcomes the disadvantages of the thermite technique and the flash butt weld technique.

In accordance with the present invention, the ends of rails to be joined are spaced from each other to define a gap having a lower opening. This gap has a width for the purposes of gas shielded arc welding by providing filler metal and gun in the gap. In accordance with the invention, an elongated steel barrier plate with a length generally corresponding to the width of the rails at the base and a width greater than the width of the gap, is wedged between the rails at the bottom of the gap. Thus, in the lower portions of the base areas of the gap, this steel barrier plate is driven to span between the spaced rails. This wedging action causes a contact between the barrier plate and the two rails, both of which are grounded. After wedging the barrier plate into position at the bottom of the gap between the rails, the gap is filled with molten metal by the gas shielded electric arc welding process which is initiated by bringing a welding gun downwardly until the electrode filler metal contacts the barrier plate. The plate has a thickness of generally one-eighth inch and in the range of 0.050 to 0.300 inches. Since this lower barrier plate is tightly wedged between the rails at the bottom of the gap, the welding process is started by bringing the filler metal electrode into contact with the barrier plate. The welding, thus, takes place on the top of the relatively substantial fixed barrier plate in accordance with standard gas welding technique. In the lower portion, the gas welding technique is a constant voltage spray arc welding. This process allows for high heat and penetration at the lower layer of weld metal. The electrode is a high strength, low alloy metal-cored electrode, wherein the core material provides the needed alloy metals. The metal cored electrode is shielded with an appropriate shielding gas. In practice, the metal-cored electrode is a MC 1100 Outershield electrode with a gas shielding of 95% Argon and 5% of Carbon Dioxide or Oxygen. The core metal of the electrode is selected to match the metal forming the spaced rails to give the necessary yield strength. The gas shielding is provided around the advancing metal-cored electrode in accordance with standard practice in either the spray mode or a subsequently used pulsed mode of arc welding. In this process, very little slag is created, which was a problem with the submerged arc and electroslag processes. Such slag created in those processes can result in inclusions in the metal, especially at the interface between the molten metal and the ends of the rails. These inclusions cause failures.

The present invention utilizes a gas shielded arc welding process in either the pulsed mode or a constant voltage spray mode, with the spray mode being used at the bottom of the gap adjacent the novel barrier plate wedged between the spaced rails. The invention uses a high performance digitally controlled power supply with a complex, high speed waveform control. In practice, a Lincoln Electric Powerwave 450 power supply is provided which has the capability of switching immediately between constant voltage spray welding and then an appropriately controlled pulsed welding process. In each instance, the welding process of the present invention is a gas shielded electric arc welding process which produces the high heat necessary to provide a sound metal interface between the ends of the rails and the weld metal produced by the metal-cored electrode as it advances towards the pool of molten metal in accordance with standard welding practice. Before performing this operation, the rails are preheated to a temperature of about 900° F. The first layer of weld metal is laid while consuming the barrier plate wedged between the rails by moving the electrode across the gap while it is moving transversely along the gap. The root pass is applied by the spray welding process, as are the next several layers to allow high penetration and a high heat in the large area at the base of the rails. Thereafter, the power supply is switched to a pulsed weld process. Additional passes are made to fill in the area between the rails at the lower base of the rails. After the first or second passes, the wedged barrier plate is no longer a factor since the molten metal above the plate is solidified. When the welding process approaches the web portion of the rails, contoured copper shoes are used to enclose the gap so that the gap now provides an enclosed cavity. The cavity is filled by continuing the shielded gas welding process, which process is converted back to the constant voltage spray mode to penetrate effectively. This arc welding process continues beyond the web to the head of the rails. In practice, the pulsed mode of operation is employed to provide transition areas between the spray mode of constant voltage welding, which process is used at the major part of both the head and web and at the starting part of the lower base. It has been found that good results can be obtained by switching between a spray mode and a pulsed mode of operation. The pulse arc mode of welding is used for heat input control during certain portions of the total welding process.

As so far described, a gas shielded electric arc welding process fills the gap between the spaced rails, which process is made possible by the use of a lower barrier plate actually wedged between the two rails at the bottom of the gap between the rails. This barrier plate is formed of steel and has a thickness of between 0.050 to 0.300 inches. The lateral edges of the plate are chamfered to produce about a 0.030 inch vertical contact ledge. In this manner, the wedging action can deform the edges of the barrier plate to ensure positive electrical contact between the rails and the barrier plate. In practice, the original width of the barrier plate is greater than the width of the gap between the rails to ensure a tight wedging action as the barrier plate is forced into a wedged position at the bottom of the gap. The width of the plate is in the range of 0.010 to 0.025 inches greater than the width of the gap. This causes a distortion of the plate as it is wedged into position and assures a fixed position and electrical contact, which contact is essential to an efficient subsequent arc welding process. In the past, no such starting mechanism was provided for an electric arc welding process used to join the spaced ends of railroad rails.

In accordance with another aspect of the present invention, the novel method and system includes a heat insulation element, or ceramic layer, below the barrier plate and overlapping the lower opening of the gap to prevent the arc from penetrating through to the copper whereby the arc could melt a portion of the copper which could cause copper induced cracking problems. The copper support block is located under the rails for preventing loss of the molten metal in the gap and is a heat sink to prevent over heating of the weld deposit.

In accordance with yet another aspect of the invention, the foregoing gas shielded arc welding process is carried out using an elongated steel barrier plate structured to provide a central portion received in the lower end of the base gap and sides extending along the central portion and underlying the bottoms of the bases of the rails. A heat insulating element, preferably a ceramic tile, underlies and spans the barrier plate and has opposite sides overlapping the sides of the barrier plate, and a copper base shoe has an upwardly open recess for accommodating the insulating element and engaging the latter against the undersides of the rail bases such that the barrier plate is held in a fixed position relative to the bottoms of the bases. More particularly in this respect, the base shoe and insulating element engage the sides of the barrier plate against the undersides of the bases of the rails such that distortion or movement of the barrier plate by the expansion of the rails during the preheating operation is prevented as is distortion of the thin barrier plate by the advancing welding arc during the depositing of the root pass. Further, the engagement of the sides of the barrier plate with the rails assures that the arc length does not change as the torch moves along the gap to deposit the root pass. Preferably, the ceramic tile providing the heat insulating element is placed in the base shoe and the barrier plate is placed on the ceramic tile, and the base shoe, tile and barrier plate assembly is inserted as a unit relative to the bottoms of the rail bases. Further in accordance with this aspect of the invention, the copper base shoe and copper side mold shoes are water cooled to improve the ductility of the welded joint.

Preferably, in this embodiment of the barrier plate, the latter is longer than the width of the bases of the rails to provide a small weld run-on and run-off area at the opposite ends of the gap to optimize the quality of the weld deposit. After the weld is completed, the extra weld metal is removed, such as by grinding. Preferably, the sides of the barrier plate underlying the bottoms of the bases of the rails are chamfered to thin the sides of the barrier plate so as to allow the arc to completely consume the plate in the side areas so as to leave a smooth root weld contour. Further, the opposite side edges of the barrier plate adjacent one end thereof are provided with laterally outwardly open passages between the top and bottom surfaces of the barrier plate. These passages facilitate complete penetration of weld metal in the start area of the root pass while the welding heat is starting to build up. Accordingly, while the welding heat at start up might not be sufficient to completely consume the thin sides of the barrier plate as desired to achieve a smooth root weld contour, the passages promote the desired end result by providing for complete penetration in the start area.

The primary object of the present invention is a provision of a method and system for gas shielded arc welding of steel railroad rails, which method and system can be performed rapidly in the field and have a low failure rate.

Yet another object of the present invention is a provision of a method and system, as defined above, which method and system employs the concept of wedging a metal barrier plate in the bottom of the gap between the spaced rails to start and control the lower portion of the gas shielded arc welding process used in the method and system of the invention.

Still another object of the invention is a provision of a barrier plate to be wedged between spaced railroad rails at the bottom of the gaps between the rails for the purposes of allowing an efficient and rapid joining of the rails by a gas shielded arc welding process.

A further object of the invention is the provision of a method and system which employs the concept of a metal barrier plate structured so as to span the gap between the spaced rails at the bottom of the bases thereof and to underlie the bottoms outwardly adjacent the gap and to be fixed relative to the rails so as to preclude distortion or movement thereof by expansion of the rails during a preheating operation and to prevent distortion of the barrier plate by the welding arc during the welding operation.

Another object of the invention is the provision of a method and system of the foregoing character wherein the ductility of the welded joint is optimized by cooling the base shoes and side mold shoes used during the filling of the gap between the rail members.

A further object is the provision of a barrier plate structure of the foregoing character in which passages are provided therethrough adjacent the bottom edges of the spaced rails to promote complete penetration of weld metal in the root pass starting area and wherein weld run-on and run-off areas are provided at the opposite ends of the barrier plate to assure a high quality weld deposit for the root pass.

These and other objects and advantages will become apparent from the following description taken together with the accompanying drawings.

BRIEF DESCRIPTION OF THE DRAWINGS

FIG. 8 is a view similar to FIG. 7 showing the arc welding gun and electrode at the start of the arc welding process;

FIG. 9 is a top plan view of the gap between the space rails illustrating certain requirements for the metal barrier plate, shown in FIGS. 5 and 6;

FIG. 10 is a top view showing the gap between the space rails with the root pass or first layer being processed;

FIGS. 11 and 11A are enlarged, partially cross-sectional views showing the progress of the welding process in the gaps adjacent the base of the rails and then starting in the web area of the rails;

THE PREFERRED EMBODIMENT

Figure 1:
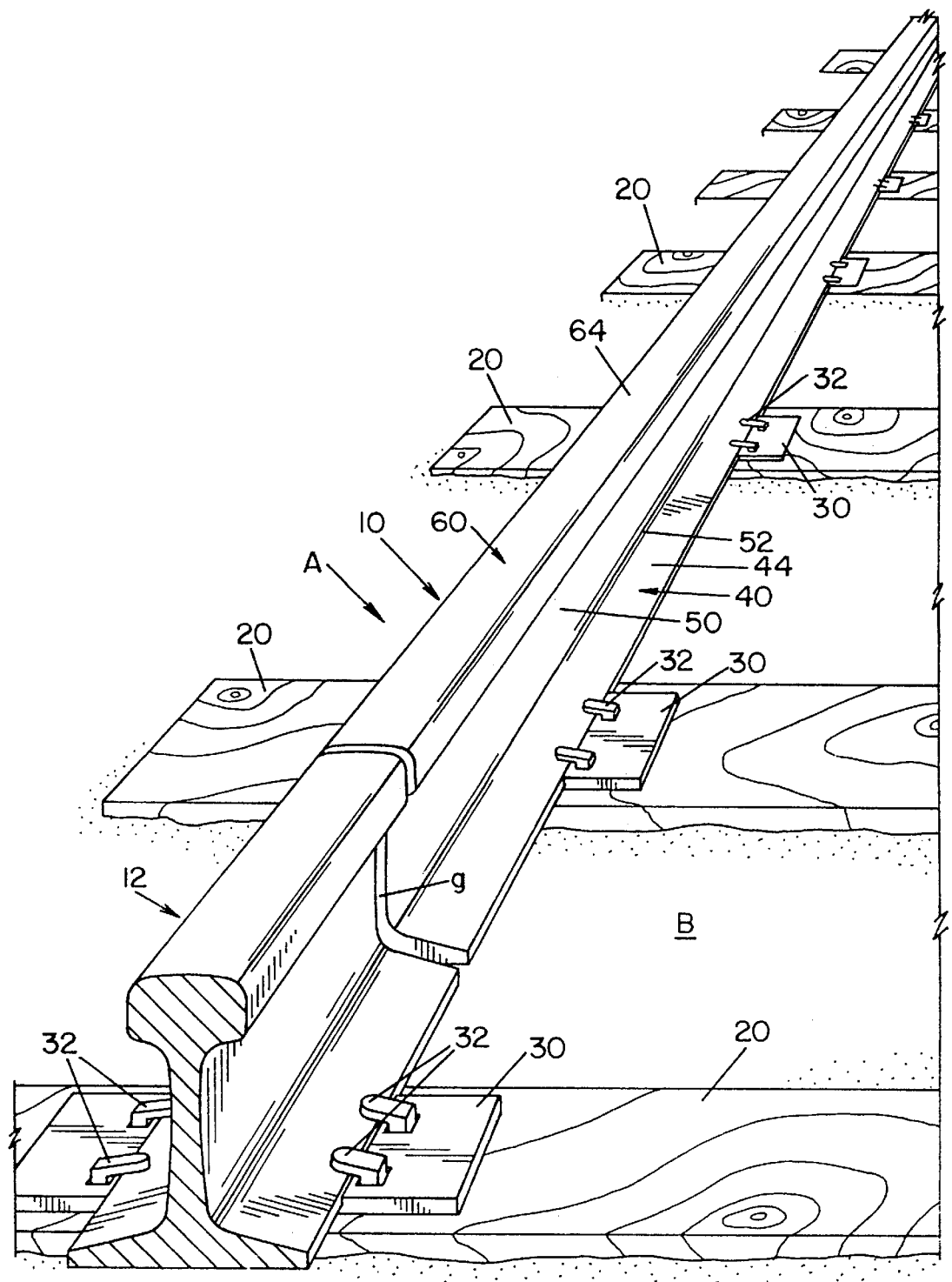
FIG. 1 is a pictorial view of a railroad with rails spaced to define a gap ready for joining in the field.
Figure 2:
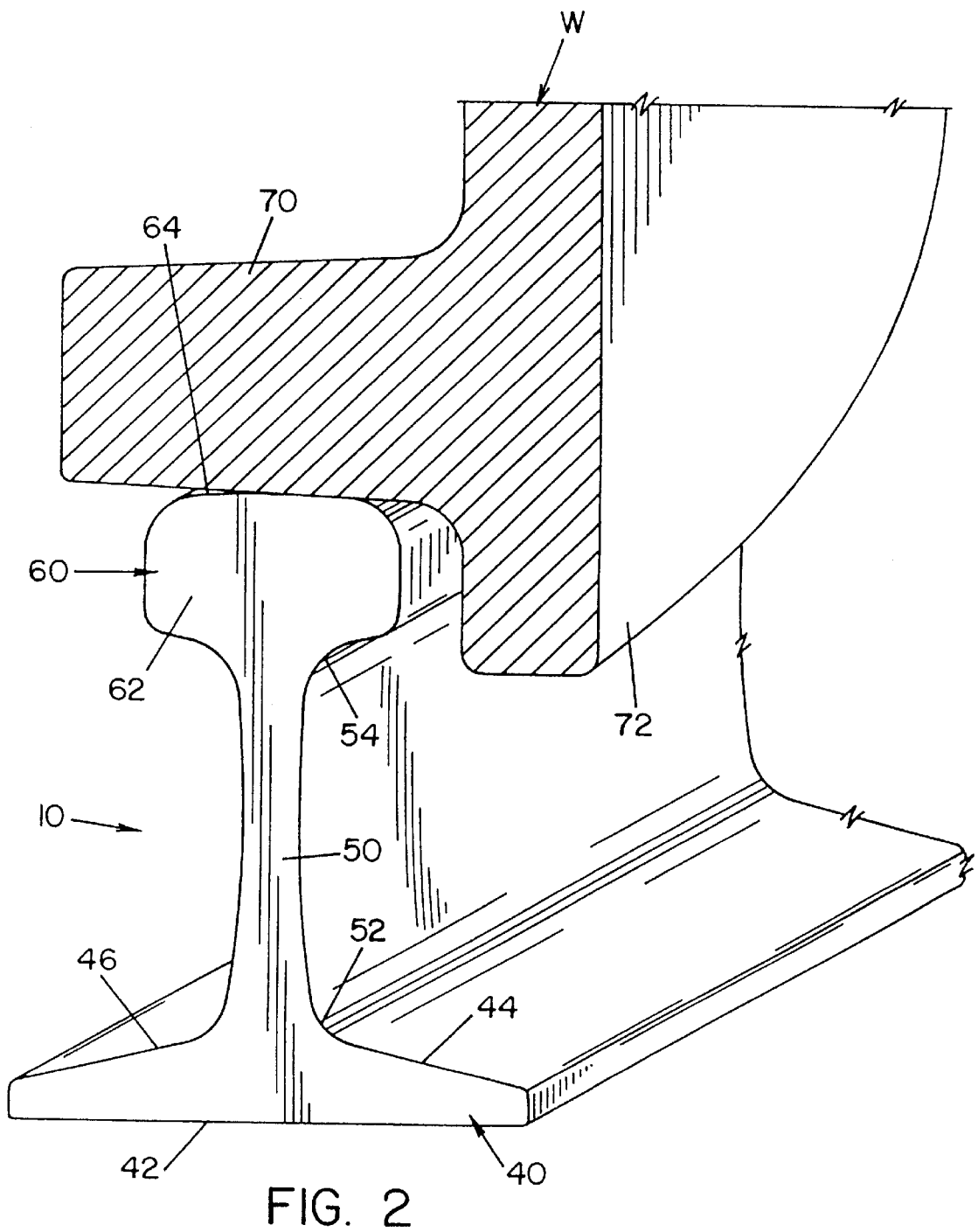
FIG. 2 is a cross-sectional view of the end of the rail with a part of the wheel shown for the purposes of illustrating the need for hardness at the head of the joint between the rails.

Referring now to the figures wherein the drawings are for the purpose of illustrating the preferred embodiment of the invention only and not for the purpose of limiting same, FIG. 1 shows a railroad rail A laid on right-of-way bed B and including rails 10, 12 to be joined to form a continuous welded rail (CWR) and supported on bed B by ties 20, steel support caps 30 and spikes 32. Rails 10, 12 are spaced to define a gap g which is to be filled by molten metal to join the two rails 10, 12 together as a continuous rail in the field, as opposed to a plant assembly of continuous rail. Gap g can be the gap between two sections of rail to be repaired or the gap between two sections of rail which are to be initially installed as a continuous welded rail system. If the gap g is used for repairing, it is sometimes necessary to cut the rails and insert a long rail section. This process is used for repairing rails which have fractures, joints which have fractured or joints which are defective. In all instances, the two spaced rails 10, 12 are separated by a gap g which is generally 1.00 inches. The pictorial representation in FIG. 2 shows rail 10 which has a standard profile or cross-section including a lower base 40 which is quite wide and includes a support bottom 42 for stabilizing the rail on ties 20 to support the weight of trains passing along the rails. Base 40 has two upwardly angled top portions 44, 46 that merge into a vertically extending web 50 having a lower fillet 52 and an upper fillet 54. The upper fillet merges into head 60 having a large body portion 62 and an upper wheel support surface 64, known as the rail crown, which surface area receives a rolling wheel W having a cylindrical rim 70 and a disc 72 that prevents the wheel from moving to the left on the head 60 as the wheel rolls along the rail. In view of the contact of the wheel with the side or body portion 62, and the continuous high weight contact of rim 70 with upper surface 64, head 60 has a normal hardness of Brinell 300 with a range of −60 to +40 on the Brinell Scale. Since the head is hardened, the metal forming the rail, at least in the head portion, must be a fairly high alloy steel. The alloy steel used in the filler metal to fill gap g has hardness along the upper portion of the rail in the area of gap g that meets the rail welding specification in accordance with the present invention.

Figure 3:
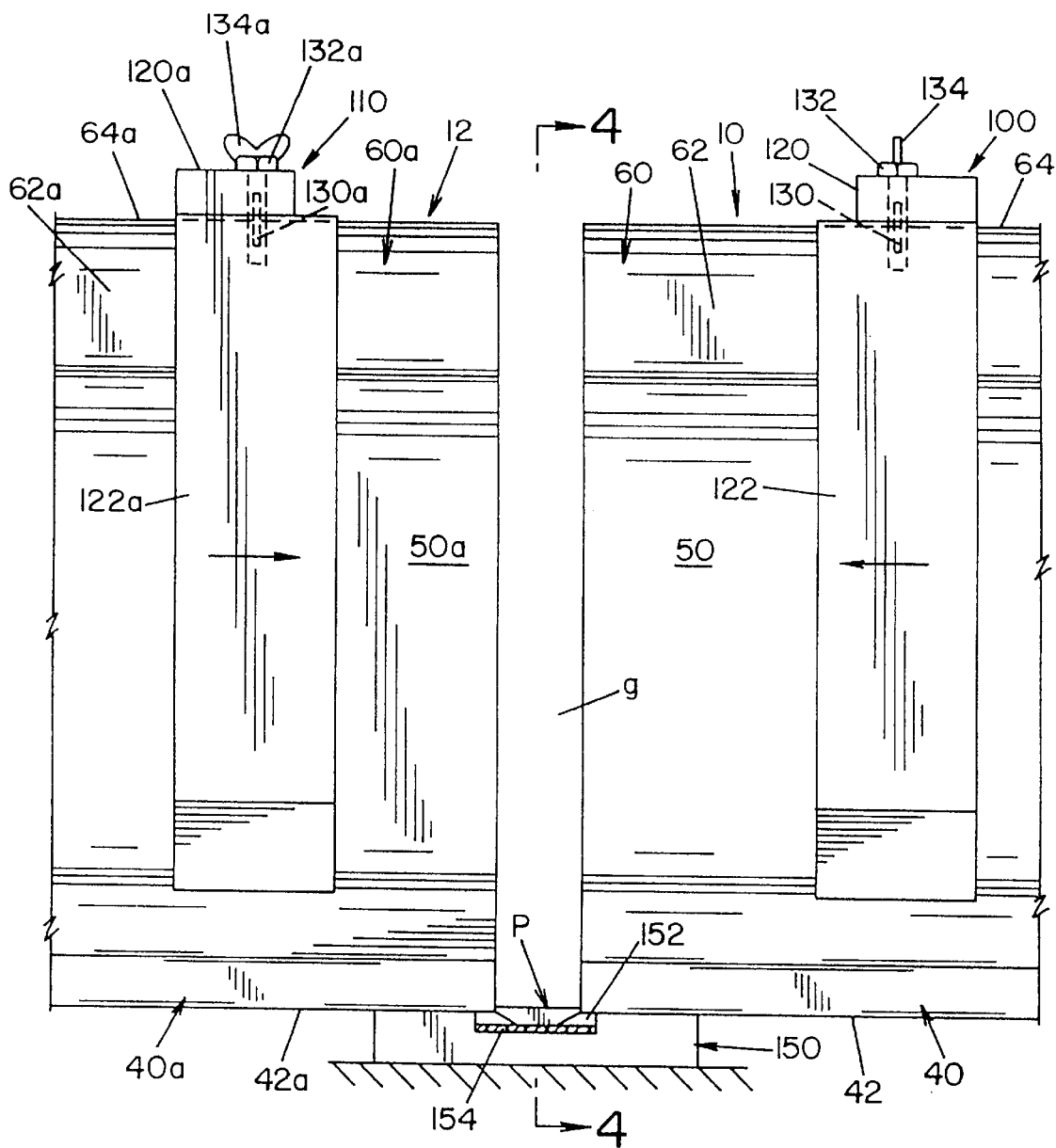
FIG. 3 is a side elevational view showing the spaced rails being conditioned for the start of the method and system of the present invention.
Figure 4:
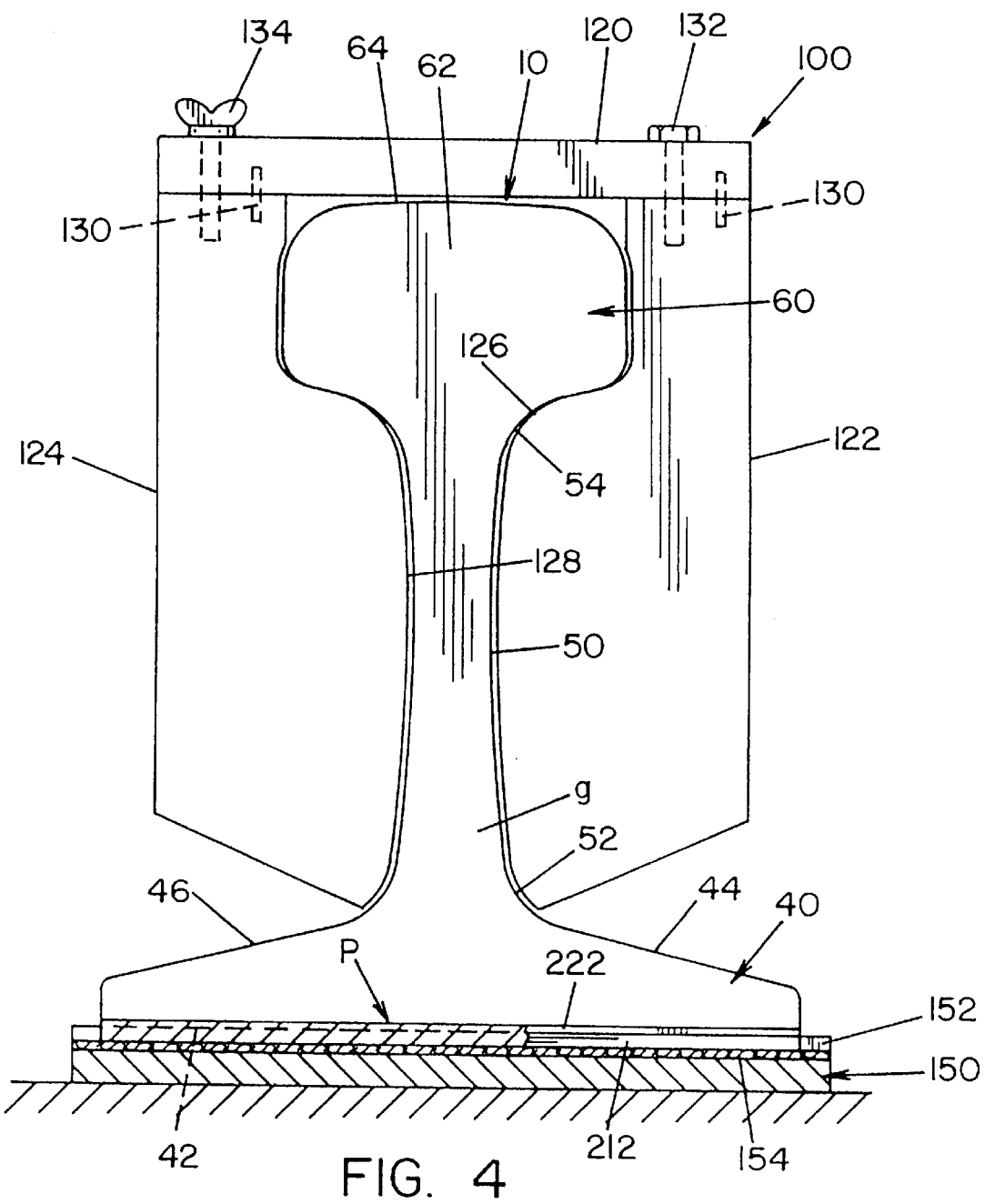
FIG. 4 is a cross-sectional view taken generally along line 4—4 of FIG. 3.
Figure 5:
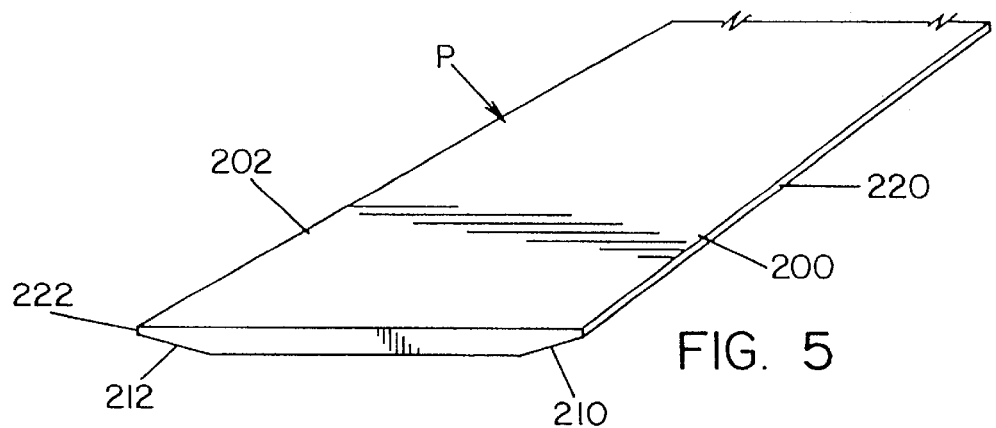
FIG. 5 is a pictorial view of the novel barrier plate constructed in accordance with the present invention.
Figure 6:
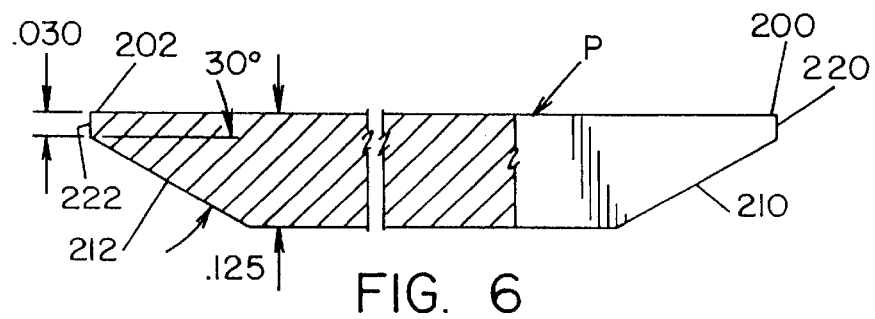
FIG. 6 is a partially cross-sectional view of the barrier plate shown in FIG. 5.
Figure 7:
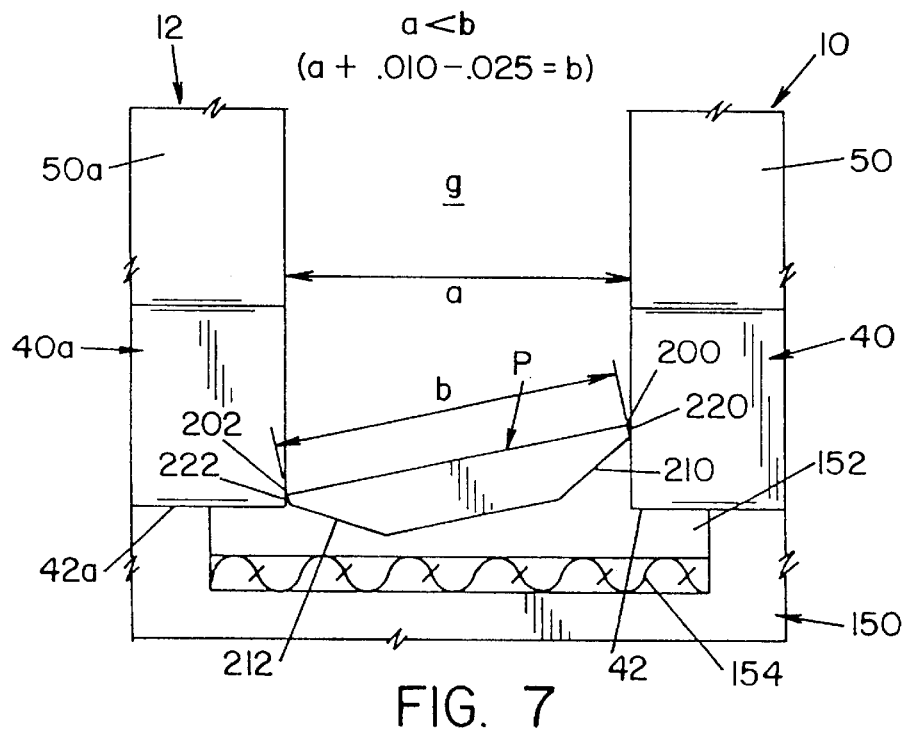
FIG. 7 is a schematic view illustrating characteristics of the novel barrier plate shown in FIGS. 5 and 6 as it is being wedged into position between the rails.

In FIG. 3, the elements on rail 12 corresponding to elements on rail 10 are indicated by the suffix "a." This same designation will be used in explaining the copper shoes 100, 110 wherein shoe 100 is draped over rail 10 and shoe 110 is draped over rail 12. Shoe 100 will be described in detail and the same description applies to shoe 110, wherein the corresponding elements on shoe 110 corresponding to the elements on shoe 100 will be designated with "a." In FIG. 4, shoe 100 includes a top support bar 120 allowing hanging shoes 122, 124 formed of heavy copper blocks to be slidable along the head of a rail. The top support bar 120 also provides alignment of shoes 122, 124 and maintains spacing of shoe 122 from shoe 124 as well as the gap between the shoes and the rail sections. Facing inwardly toward the rail cross-section are contour faces 126, 128, respectively. These faces match the contour of rail 10 so that sliding of shoes 100, 110 together at gap g closes the gap to produce a cavity having a cross-sectional shape of the rails 10, 12. To stabilize the hanging shoes, alignment pins 130 are provided together with bolts 132, 134 to allow assembly of the heavy copper shoes 122, 124 from support bar 120. In operation, the shoes are moved to the position shown in FIG. 3 to open gap g and allow welding at the lower base portion of the rails. Thereafter, shoes 100, 110 are moved together to close the gap to allow welding in the vertically extending web portions 50, 50a of rails 10, 12, respectively. As will be explained later, a lower block 150 formed of copper, or high copper content alloy, is positioned under the bottom 42 of rail bases 40, 40a. An upper transversely extending recess 152 is dimensioned to accommodate an insulation element in the form of a ceramic layer 154 which spans the bottom portion of gap g under the rails as shown in FIG. 3. To close the bottom of gap g, there is a novel elongated barrier plate P best shown in FIGS. 5, 6 and 7.

In the past, electric arc welding in gap g was attempted, but was not successful because the processes were not consistent in operation and did not have a support structure for laying the first or second layers of filler metal in gap g. This gap is approximately 1.00 inch to accommodate a downwardly extending gun carrying an electrode and a gas nozzle such as shown in FIG. 8. In the past, since the gap has to be fairly wide to accommodate the welding equipment, there was not a uniform and consistent filling of the gap, especially at the bottom portion where it was critical because of the support function of the rails. The rails flex and are stressed drastically at base 40. To solve these problems, the present invention involves the use of plate P shown in FIGS. 5–7. This plate is formed of low carbon steel, since the alloying in the gap is accomplished by the metal powder in the core of the electrode used in the arc welding process. This plate has a thickness in the range of 0.050 to 0.300 inches. In practice, the plate has a thickness of 0.125 with a width between parallel edges 200, 202 being designated as dimension b in FIG. 7. This dimension, in its original condition, is slightly greater than the width a of gap g. Consequently, plate P must be forced, such as by a hammer, to be wedged between rails 10, 12 at the lowermost portion of the rails, as shown in FIG. 3. This wedging action causes the plate to be swaged to a slightly smaller final width. This wedging action which swages one or more of the edges 200, 202 of plate P assures electrical contact between plate P and rails 10, 12, which rails are grounded. When in position, plate P rests on the top of insulating element 154 located in recess 152 of lower support copper block 150. Block 150 provides a lower barrier for molten metal being deposited in gap g between rails 10, 12 during the arc welding process to be explained later. Shown in FIGS. 5 and 6, parallel edges 200, 202 include 30° chamfers 210, 212, respectively which are initiated at about 0.030 inches below the top surface of plate P to define flat ledges or walls 220, 222, respectively. These walls are swaged against the facing surfaces of rails 10, 12 at the bottom of gap g to form the bottom of a gap to initiate the welding process. Plate P is forced and wedged into the position shown in FIG. 8 to a rigid, fixed position.

Referring now to FIG. 8, gas metal arc welding gun 250 has a diameter x, about ½ inch, and the gap g has a thickness of 1.00 inch allowing movement of gun 250 in gap g. Continuously issuing from gun 250 is a metal-cored electrode 260 supported in guide 262 which, in practice, is a high strength low alloy metal cored electrode, typically of the E110C-G type. The wire or electrode can be a Lincoln Electric electrode sold as Outershield MC 1100. As electrode 260 is advancing downward, arc C is created between plate P and electrode 260. This arc may be either used for spray or pulsed welding, as will be described later. A shielding gas G is propelled from passage 264 around electrode guide 262 in accordance with standard gas shielded arc welding technology. Wedging of plate P assures that the grounded rails are in intimate contact with barrier plate P. The upper surface of a plate is used to strike the arc and the plate itself supports the weld puddle during the first and/or second pass of electrode 260 in its progress along the upper surface of plate P fixed in gap g. This plate supports the arc during the starting operation. Insulation 154 prevents penetration of the arc to the copper support block 150. In this manner, block 150 provides a good heat sink, but does not allow copper migration into the weld. Copper contamination is prevented by plate P and the use of the lower ceramic layer 154. During the starting of the arc, the arc will not burn through the relatively thick plate P. As the arc moves back and forth between rail 10 and rail 12, the arc will move into the area of chamfers 210, 212 at which time the arc may penetrate through plate P along the edge 200, 202. However, molten weld metal from the metal-cored electrode may flow through this portion of the plate P against the lower insulation layer or ceramic layer 154 without causing any problems. Edges 200, 202 are chamfered to allow the wedging action that is necessary to create the tight electrical contact so that there is a superior grounding action at the plate during the arc welding process. The plate is wedged into the bottom of gap g. The shielding gas G surrounds arc C and the plate P maintains the lower barrier for the weld metal. In FIG. 10, it is illustrated that electrode 260 moves back and forth in a serpentine pattern as the electrode passes for the first time over plate P to lay the first or root pass R. The metal from this first pass is maintained on plate P and forms a molten metal pool joining the bottom portions of rails 10, 12.

The arc welding process is accomplished by using a digitally controlled inverter welding power source capable of complex high speed waveform control, such as the Lincoln Electric Powerwave 450 Power Supply. The root pass R is accomplished by a constant voltage spray welding process for high heat and high penetration in the root. As illustrated in FIG. 11, several layers are laid transversely across gap g in the lower portion of the gaps between bases 40, 40a of rails 10, 12, respectively. After several layers of metal have been deposited by the constant voltage process, the power supply is switched to a pulsed mode of operation and lays additional layers, as shown again in FIG. 11. This covers the base welding operation of gap g. Thereafter, as shown in FIG. 11A, shoes 100, 110 are moved to enclose the gap g at the web portion and head portion of rails 10, 12. As shown in FIG. 3, bars 120, 120a are offset transversely along the rails. This produces an upper opening between shoes 100, 110 to allow continued use of gun 250 in the welding process. This welding process can shift between constant voltage spray or the more rapid pulsed mode of operation. In both instances, the process is a gas shielded arc welding process to fill the gap with filler metal from electrode 260. The metal in the core is selected to properly alloy the filler metal in gap g to produce the desired strength and metallurgical characteristics of the weld joint.

Figure 13:
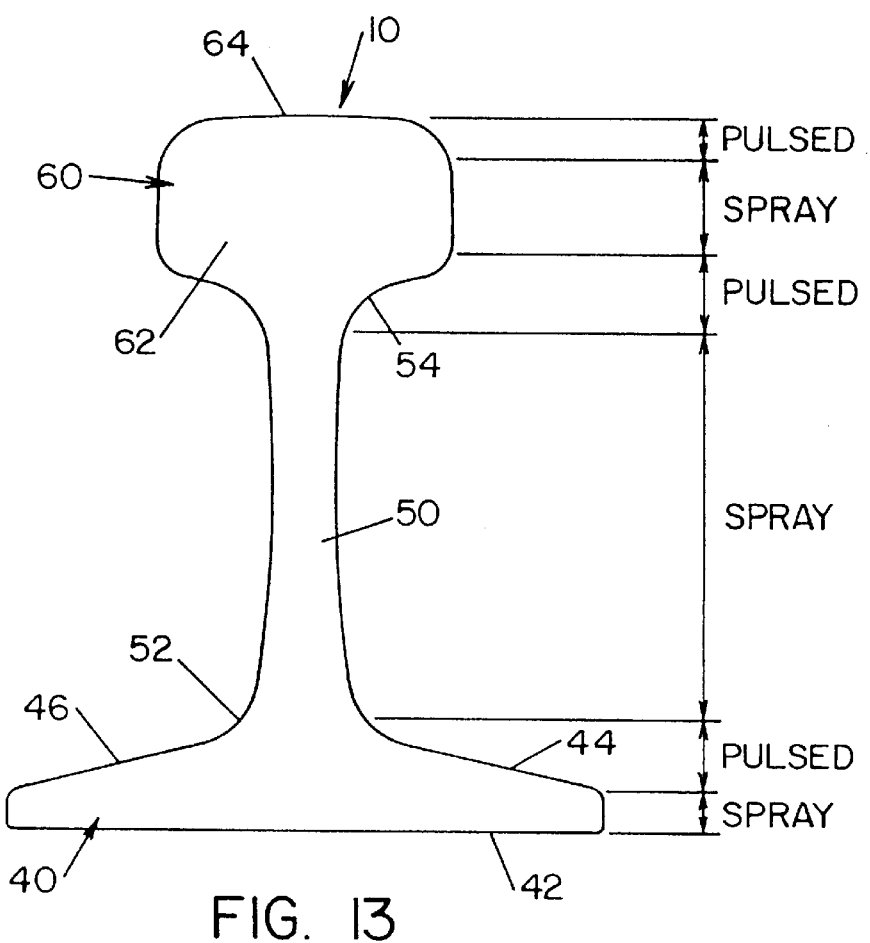
FIG. 13 is a side elevational view of the rail showing portions of the gap which are welded by constant voltage spray welding and by pulsed welding in the preferred embodiment of the present invention.

The welding process, as used in practice, is schematically illustrated in FIG. 13. A pulsed mode of operation is used adjacent the angled top portions 44, 46 of bases 40, 40a. In a like manner, a pulsed mode of operation is used in the area of fillet 54 and at the top surface 64 of head 60. The spray mode of operation is used at the bottom for starting root pass of the process to assure proper initiation of the welding process and joining of the rails at the root in gap g. Combinations of the spray mode and pulsed mode can be used or the spray mode can be used for the total process. The spray mode is used at novel plate P.

Even though the facing surfaces of rails 10, 12 are flat, it is possible that there may a slight curvature in one or more of the surfaces. This concept is schematically illustrated in FIG. 9 wherein a gap e is created between plate P and the end surface of rail 10. The limitation of the present invention is that the diameter d of electrode 260, which in practice is approximately 1/16 inch, must be substantially more than gap e so that the arc created by electrode 260 will not merely pass downwardly through insulation barrier or element 154. Even with this slight variation, there is still proper contact between the rail or rails for the purposes of grounding plate P to assure intimate electrical continuity between plate P and the grounded rails. This illustration is only presented for the purposes of discussing the concept that the plate P provides a barrier between the arc C and the lower support structure below gap g.

Figure 12:
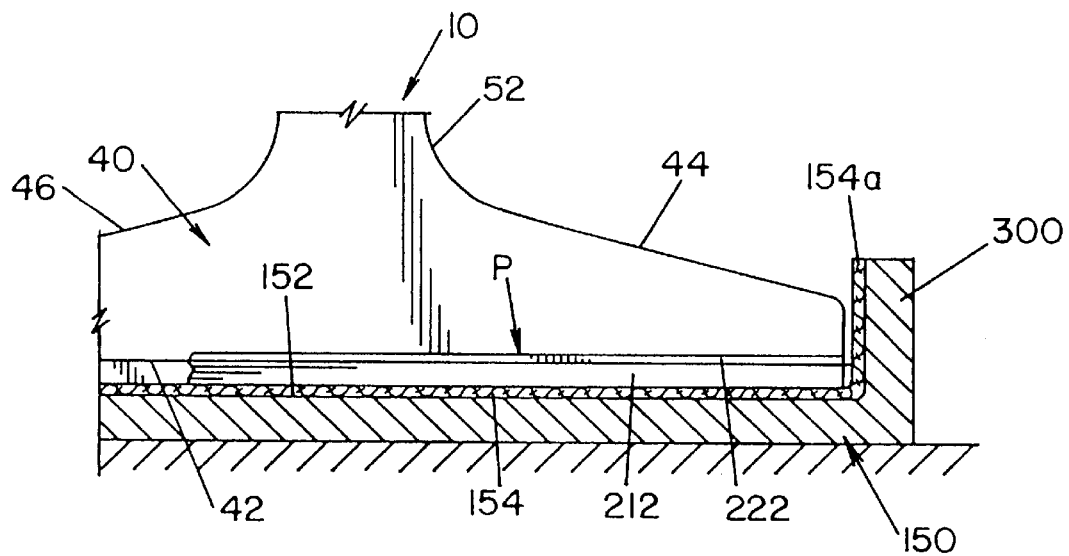
FIG. 12 is a partial cross-sectional end view showing a modification of the preferred embodiment of the present invention.

A slight modification of the invention is illustrated in FIG. 12 wherein support 150 has end plate 300 extending upwardly adjacent the lateral portions of bases 40, 40a of the rails. Insulation cloth, or ceramic layer, 154 has an elongated portion 154a that moves upwardly along end plates 300 to provide an outermost dam or barrier for the molten filler metal deposited in lower portion of gap g before shoes 100, 110 are moved together for welding in the web area and head area of gap g.

The present invention has no slag in the filler metal deposited in gap g. It also employs a gas shield process which process can be converted between spray mode of operation and pulsed mode of operation by using a variety of power supplies available in the welding field. It has been found that this welding process produces a sound weld with failure rates that rival the failure rates of the flash butt weld technique. Barrier plate P is consumed; thus, it is part of the molten metal at the root portion of gap g. The alloy material does not need to be provided by plate P since the metal-cored electrode carries the alloying metals in its core.

FIGS. 14–19 illustrate another embodiment of a barrier plate in accordance with the invention and structural modifications of the base shoe, heat insulating element and side mold shoes which, together with the barrier plate, provide another embodiment of a method and system of gas shielded arc welding steel railroad rails in accordance with the invention. In FIGS. 14–19, rails 10 and 12 are structurally identical to the rails described hereinabove and, accordingly, like numerals appear in FIGS. 14–19 with respect to the structural details of the rails. Further, the basic structures of side mold shoes 100 and 110 are identical to the structures described hereinabove and, accordingly, like numerals appear in FIGS. 14–19 with regard to the structures of the component parts which correspond to those described hereinabove.

Figure 14:
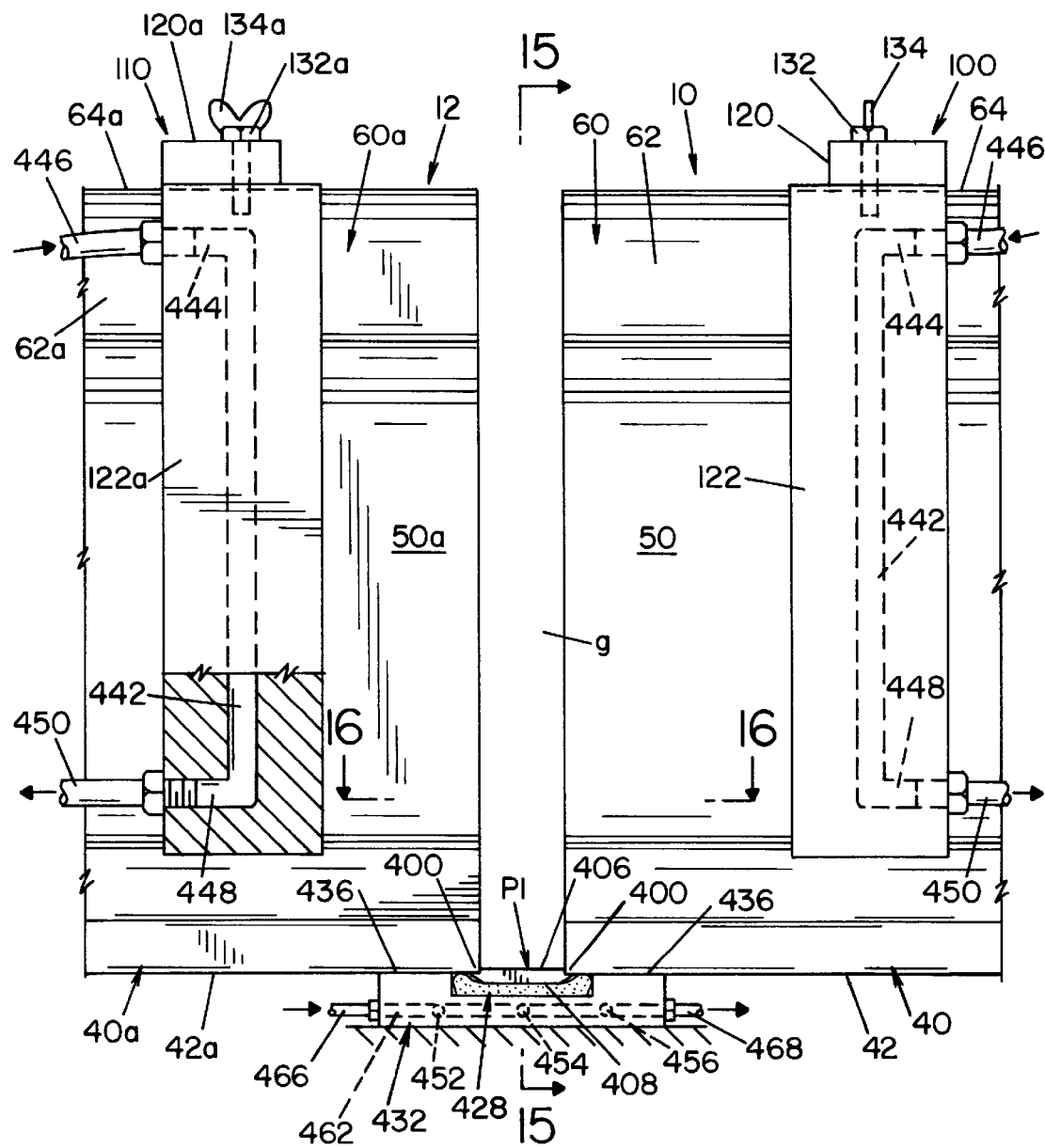
FIG. 14 is a side elevational view showing the spaced rails in association with another embodiment of a barrier plate, heat insulating element, base shoe and side mold shoes for performing a rail welding operation in accordance with the invention.
Figure 15:
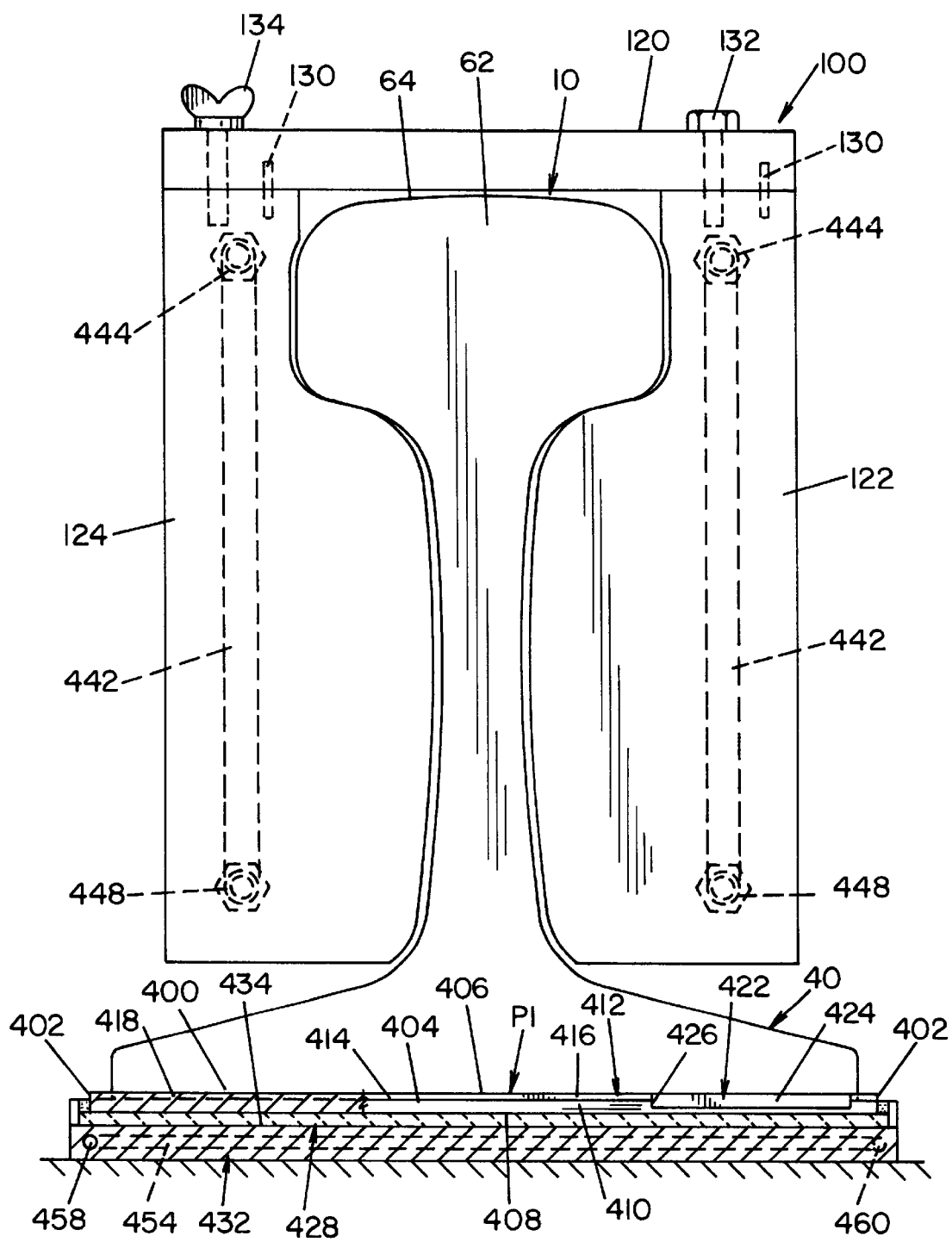
FIG. 15 is a cross-sectional view taken along line 15—15 in FIG. 14.
Figure 16:
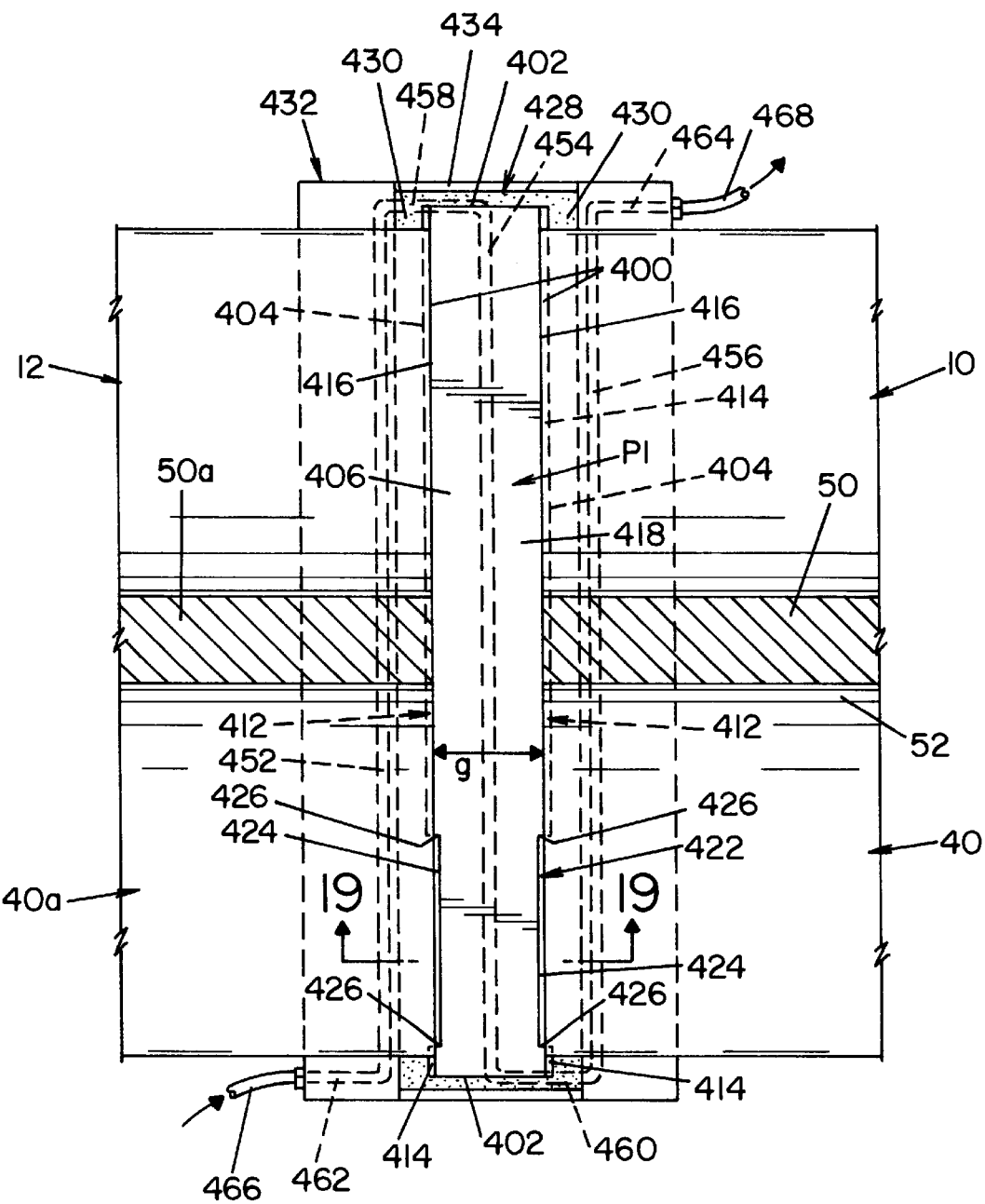
FIG. 16 is a plan view, partially in section, taken along line 16—16 in FIG. 14.
Figure 17:
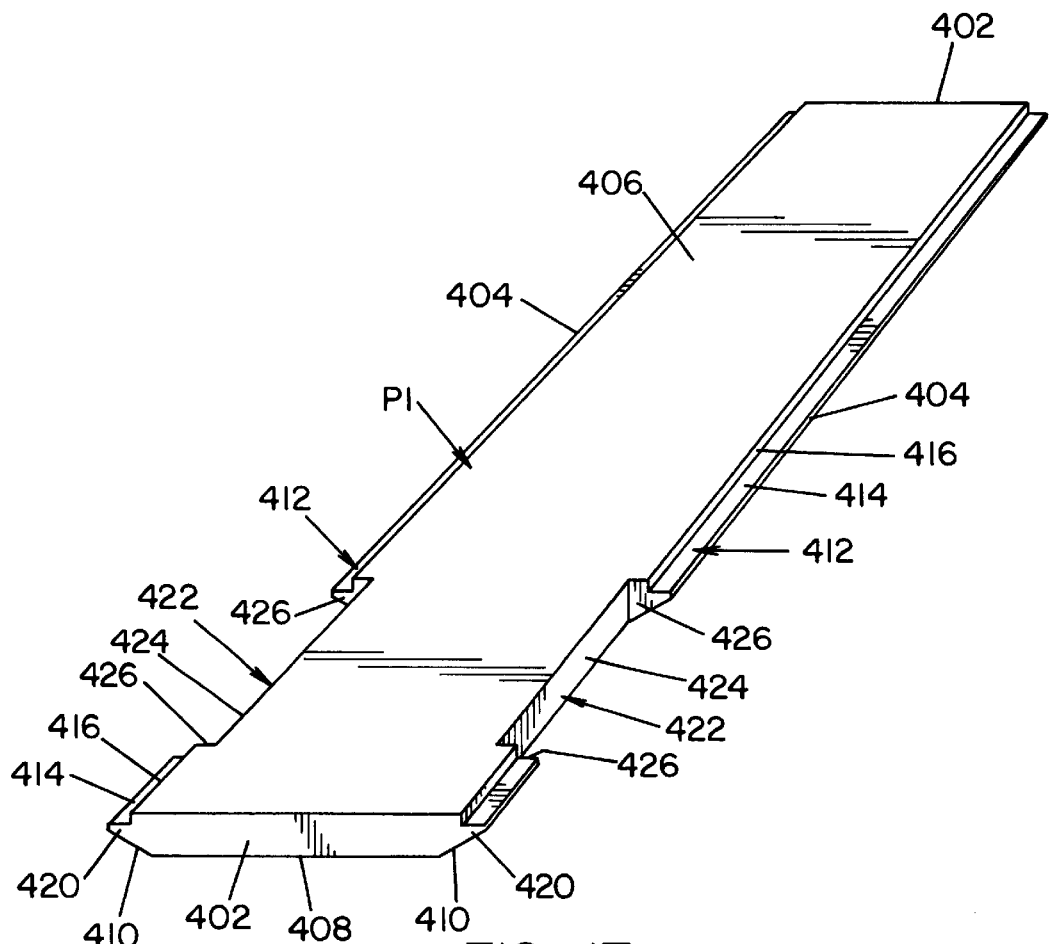
FIG. 17 is a perspective view of the barrier plate of this embodiment.
Figure 18:
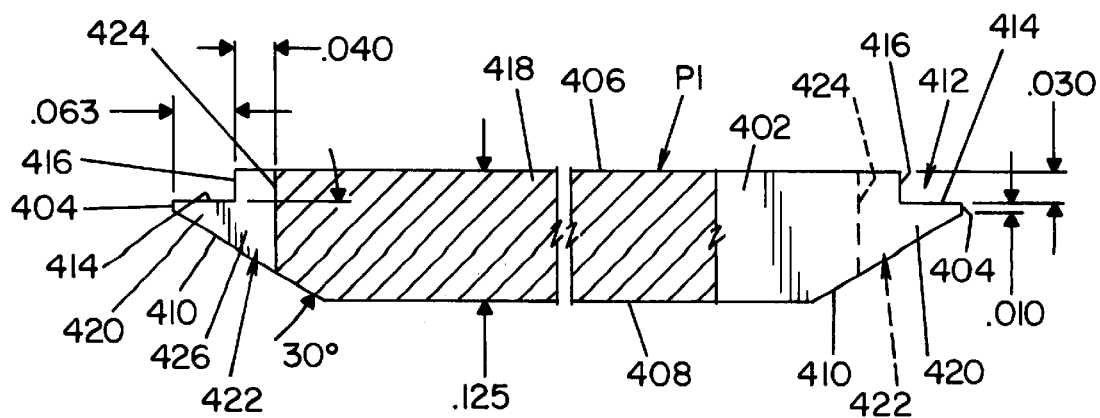
FIG. 18 is a partial cross-sectional view of the barrier plate shown in FIG. 17; and, FIG. 19 is a cross-sectional elevation view taken along line 19—19 in FIG. 16.
Figure 19:
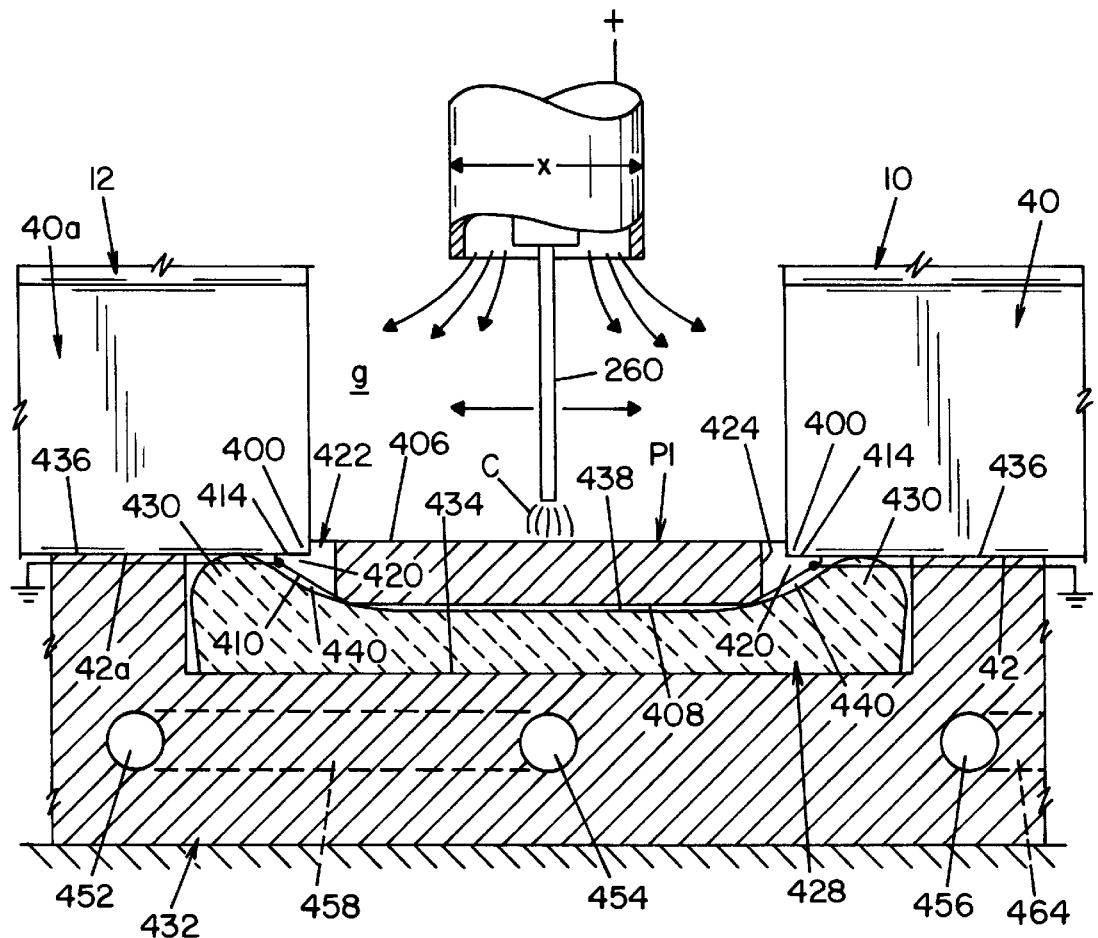

Referring now to FIGS. 14–19, the bottoms 42 and 42a of the bases of rails 10 and 12 each have a laterally extending bottom edge 400 which, as will be appreciated from FIGS. 15 and 16, has a length corresponding to the distance between the laterally opposite ends of the corresponding rail base. As best seen in FIGS. 16–18, barrier plate P1 in accordance with this embodiment is elongate in the lateral direction of gap g and has longitudinally opposite ends 402, laterally opposite side edges 404 extending between ends 402, a top surface 406, and a bottom surface 408 which includes chamfers 410. Each chamfer is initiated at about 0.030 inch below top surface 406 and extends downwardly and inwardly of the corresponding edge 404 at an angle of about 30° relative to the top surface. Laterally opposite side edges 404 provide the barrier plate with a width which is greater than the width of gap g between the rail bases, and recesses 412 are provided in top surface 406 inwardly of side edges 404 and between the opposite ends of the barrier plate. Each recess 412 includes a bottom wall 414 parallel to top surface 406 and an inner side wall 416 perpendicular to bottom wall 414 and parallel to the corresponding side edge 404. Side walls 416 are laterally spaced apart to provide the barrier plate with a central portion 418 having a width which provides for the central portion to be received in gap g, as shown in FIG. 19, and as further seen in the latter figure, recesses 412 receive the adjacent portions of bases 40 and 40a of rails 10 and 12 and provide the barrier plate with side portions 420 which underlie bottoms 42 and 42a of the rails. Preferably, each recess 412 has a width of about 0.063 inch and a depth of about 0.020 inch.

For the purpose set forth hereafter, each of the laterally opposite side edges of barrier plate P1 is provided with a laterally outwardly open passage 422 which extends between top surface 406 and chamfer portions 410 of the bottom surface of the barrier plate. Each of the passages 422 includes an inner wall 424 parallel to and spaced laterally inwardly of inner wall 416 of the corresponding recess 412, and longitudinally spaced apart end walls 426 extending laterally outwardly from wall 424. Passages 422 are preferably laterally aligned with one another and adjacent one of the ends 402 of the barrier plate, and the passages are spaced inwardly from the end of the plate so as to be located inwardly of the end of bottom edge 400 of the corresponding rail base. Preferably, for the purpose set forth hereinafter, barrier plate P1 has a length between ends 402 which is greater than the length of bottom edges 400 of the rail bases, whereby the spacing of passages 422 from end 402 is sufficient to provide for the passages to be spaced inwardly of the outer ends of the bottom edges 400, as shown in FIG. 16. Preferably, each passage 422 has a length of about 1.63 inches and a width of about 0.103 inch.

Further in accordance with this embodiment, as best seen in FIG. 19, a heat insulating element 428, preferably a ceramic tile, is positioned beneath barrier plate P1 between the opposite ends thereof, laterally spans the barrier plate and includes sides 430 overlapping the corresponding one of the side portions 420 of the barrier plate. Further, a copper base shoe 432 has an upwardly open recess 434 which accommodates heat insulating element 428, laterally spans the insulating element and provides the shoe with top surfaces 436 engaging the bottoms 42 and 42a of rails 10 and 12. Preferably, heat insulating element 428 has a profile providing a top surface 438 underlying and engaging bottom surface 408 of barrier plate P1, and providing opposite sides 430 with a bulbous contour which engages the corresponding one of the bottom surfaces 42 and 42a of the rails laterally outwardly of side portions 420 of the barrier plate. The contour of sides 430 provide a pocket 440 beneath each rail bottom for the purpose set forth hereinafter. Preferably, heat insulating element 428 is positioned in base shoe 432 and barrier plate P1 is then positioned on the heat insulating element to provide an assembly which is then positioned as a unit beneath the ends of the spaced apart rails, whereby the barrier plate is positioned and fixed relative to the bottoms of the rails and the base gap therebetween so as to preclude movement or distortion of the barrier plate during preheating of the component parts and distortion of the barrier plate during the laying of the root pass.

Further in accordance with this embodiment, base shoe 432 and side mold shoes 100 and 110 are provided with coolant passageways therethrough for the circulation of a coolant such as a water during the welding process. More particularly in this respect, as best seen in FIGS. 14 and 15 with regard to shoes 100 and 110, each of the side components 122 and 124 of shoe 100 and each of the side components 122a and 124a of shoe 110 is provided with a vertically extending coolant passageway 442 having an entrance end 444 for connecting the passageway with a source of coolant, not shown, through an inlet line 446 and having an exit end 448 for returning coolant to the source through a return line 450. With regard to base shoe 432, as best seen in FIGS. 14 and 16, the portion of the shoe below the plane of the bottom of recess 434 is provided with a serpentine passageway defined by longitudinally spaced apart and parallel passageway portions 452, 454 and 456 and connecting portions 458 and 460 respectively between portions 452 and 454 and between portions 454 and 456. The serpentine passageway includes an entrance end 462 and an exit end 464 for respectively connecting the passageway with a source of coolant, not shown, through an inlet line 466 and a return line 468.

The welding procedure in connection with this embodiment can be the same as that described herein in connection with the embodiment of FIGS. 1–13. Partially in this respect, the rails are preheated and the first or root pass layer of weld metal is laid by moving the electrode across the gap along a serpentine path. As will be appreciated from FIG. 16, the laying of the root pass is initiated at the end of barrier plate P1 having passages 422 therethrough, whereby the complete penetration of weld metal at the beginning of the root pass is assured during the initial period when the welding heat is building up but has not reached the temperature necessary to consume the barrier plate in the areas of the sides thereof underlying the bottoms of the rails. As will be appreciated from FIG. 19, pockets 440 beneath the rail bottoms provide a space for the molten metal passing through passages 440 and, further, promotes full penetration through sides 420 of the barrier plate when the weld temperature is high enough for sides 420 to be consumed. Further in accordance with this embodiment and again as will be appreciated from FIG. 16, the opposite ends of barrier plate P1 extend laterally outwardly of the corresponding ends of the rail bases, preferably about one quarter inch, to provide weld run-on and run-off areas respectively at the starting point and ending point of the root pass to assure a high quality weld deposit along the entire length of the rail bases. As mentioned hereinabove, at the completion of the welding operation the extra weld metal in the run-on and run-off areas can be removed such as by grinding. The root pass and the next several layers are applied by the spray welding technique to allow high penetration and a high heat in the large area of the base of the rails. A coolant such as water is circulated through the coolant passageway in base shoe 432 throughout the welding process, and when the layers of weld metal approach the web portion of the rails, the side mold shoes are moved into place to enclose the gap and coolant is circulated through the components of the side mold shoes as the cavity is filled by continuing the shielded gas welding process.

While considerable emphasis has been placed herein on the preferred embodiments and preferred dimensions and parameters in connection therewith, it will be appreciated that other embodiments can be devised and that many changes can be made in the embodiments disclosed herein without departing from the principles of the invention. Accordingly, it is to be distinctly understood that the foregoing descriptive matter is to be interpreted merely as illustrative of the invention and not as a limitation.

Having thus described the invention, it is so claimed:

1. A method of gas shielded arc welding railroad rails each comprising a base having a bottom, a vertically extending web and an upper head, said rails being longitudinally spaced apart to provide a base gap, a web gap and a head gap therebetween to be filled with steel to join said rails, said bottom of each said base having a laterally extending bottom edge and said base gap having a selected width between the bottom edges of the rails, said method comprising the steps of:

(a) providing an elongated steel barrier plate having laterally opposite sides extending in the direction of said bottom edges, a width between said opposite sides greater than said selected width of said base gap, top and bottom sides, and a recess in said top side along each of said laterally opposite sides forming a barrier plate portion having a width corresponding to said selected width;

(b) positioning said barrier plate for said plate portion to extend upwardly into said base gap at the bottom of said bases and for the recesses to receive the bottoms of the rails along the bottom edges thereof; and, (c) filling said base, web and head gaps above said steel barrier plate with a molten steel from an advancing filler metal electrode by a gas shielded electric arc welding process.

2. The method as defined in claim 1 including the steps of:

(d) positioning side mold shoes over the laterally opposite ends of said web gap, and said head gap after said filling step has filled base gap with filler metal at said bases; and, (e) cooling said side mold shoes during the filling of said web gap and said head gap.

3. A method as defined in claim 1 including the step of:

(d) locating a heat insulation element below said bottom side of said barrier plate and overlapping said opposite sides of said barrier plate and the bottoms of said bases of the spaced rails.

4. The method as defined in claim 3 including the steps of:

(e) positioning side mold shoes over the laterally opposite ends of said web gap, and said head gap after said filling step has filled base gap with filler metal at said bases; and, (f) cooling said side mold shoes during the filling of said web gap and said head gap.

5. A method as defined in claim 3 including the step of:

(e) providing a metal base shoe below the bottoms of the bases of the rails, said base shoe having an upwardly facing recess to accommodate said insulation element.

6. The method as defined in claim 5 including the steps of:

(f) positioning side mold shoes over the laterally opposite ends of said web gap and said head gap after said filling step has filled said base gap with filler metal;

(g) cooling said base shoe at least during the filling of said base gap; and, (h) cooling said side mold shoes during the filling of the web and head gaps.

7. The method as defined in claim 1 wherein said gas shielded electric arc welding process of said filling step is a multipass arc welding process.

8. The method as defined in claim 1 wherein said gas shielded electric arc welding process of said filling step is an arc welding process including the step of moving the electrode in a serpentine path as said electrode traverses said gap.

9. The method as defined in claim 1 wherein said gas shielded electric arc welding process of said filling step is primarily a multipass spray transfer process.

10. The method as defined in claim 1 wherein said gas shielded electric arc welding process of said filling step is a combination of a multipass spray transfer process and a pulsed welding process with said spray transfer process being used at said base gap.

11. The method as defined in claim 1 wherein said gas shielded electric arc welding process of said filling step is a multipass spray transfer process at least at said base gap and said web gap.

12. A method as defined in claim 1 wherein said elongated steel barrier plate is formed from low carbon steel.

13. A method as defined in claim 1 wherein said elongated steel barrier plate has a thickness of about 0.125 inch.

14. A method as defined in claim 1 wherein said bottom side of said barrier plate is chamfered along each of said opposite sides of said barrier plate.

15. A method as defined in claim 1 wherein each of said recesses in said barrier plate has a width of about 0.063 inch.

16. A method as defined in claim 15 wherein said barrier plate has a thickness of about 0.125 inch and each said recess has a depth of about 0.020 inch.

17. A method as defined in claim 1, including the step of:
   (d) providing a passage between the top and bottom sides of said barrier plate adjacent one end of each of said bottom edges of said rails for molten metal to flow across said barrier plate during a root pass of the filling of said base gap.

18. A method as defined in claim 1, including the steps of:
   (d) providing a metal base shoe having a top surface and an upwardly open recess in said top surface having a width greater than the width of said barrier plate;
   (e) providing a heat insulating element having a width corresponding to the width of said recess and having an upwardly open cavity having a contour for receiving said barrier plate;
   (f) positioning said barrier plate in said recess of said insulating element and positioning said insulating element in said recess of said base shoe to provide a base shoe assembly; and,
   (g) installing said assembly to the bottoms of said bases of said rails.

19. A method as defined in claim 18 including the steps of:
   (h) positioning side mold shoes over the laterally opposite ends of said web gap and said head gap after said filling step has filled said base gap with filler metal;
   (i) cooling said base shoe at least during the filling of said base gap; and,
   (j) cooling said side mold shoes during the filling of the web and head gaps.

20. A method as defined in claim 18, wherein said insulating element is a ceramic material and said bottom side of said barrier plate has chamfered edges along each of the opposite sides thereof, said contour of said cavity providing for said insulating element to have portions underlying said chamfered edges, and the further step of:
   (j) providing a passage between the top and bottom sides of said barrier plate adjacent one end of each of said bottom edges of said rails for molten metal to flow across said barrier plate during a root pass of the filling of said base gap.

21. A method as defined in claim 20, including the steps of:
   (k) positioning side mold shoes over the laterally opposite ends of said web gap and said head gap after said filling step has filled said base gap with filler metal;
   (l) cooling said base shoe at least during the filling of said base gap; and,
   (m) cooling said side mold shoes during the filling of the web and head gaps.

22. A method as defined in claim 21, wherein said barrier plate has a thickness of about 0.125 inch, each of said recesses has a width of about 0.063 inch and a depth of about 0.020 inch, and said passage has a width of about 0.103 inch and a length of about 1.63 inches.

23. A system of gas shielded arc welding steel railroad rails each comprising a base having a bottom, a vertically extending web and an upper head, said system comprising means for holding said rails longitudinally spaced from each other to provide a base gap, a web gap and a head gap therebetween to be filled with steel to join said rails, said bottom of each said base having a laterally extending bottom edge, said edge having a length and said base gap having a selected width between the bottom edges of the bases of the rails, an elongated steel barrier plate with a length in the direction of said edges, a width greater than said selected width of said base gap and a nominal thickness, said barrier plate being located at the bottom of said base gap and including recesses receiving portions of the bottoms of the rail bases along and longitudinally adjacent said bottom edges thereof to close said base gap at said bottom edges, and welding means for filling said base gap, web gap and head gap above said barrier plate with a molten steel, said welding means including an advancing filler metal electrode.

24. A system as defined in claim 23 including side mold shoes over the laterally opposite ends of said web gap and said head gap.

25. A system as defined in claim 23, wherein said recesses provide for said barrier plate to have sides underlying said bottoms of said bases of the rails, and a heat insulating element below and spanning said barrier plate and overlapping said sides of said barrier plate and said bottoms of said bases of said spaced rails.

26. A system as defined in claim 25, and a metal base shoe spanning said heat insulating element and engaging said bottoms of said bases, said base shoe having an upwardly facing recess to accommodate said insulating element.

27. A system as defined in claim 26, including side mold shoes over the laterally opposite ends of said web gap and said head gap extending distal openings of said gap.

28. A system as defined in claim 27, including means for cooling said base shoe and said side mold shoes.

29. A system as defined in claim 23, wherein said barrier plate is formed from low carbon steel.

30. A system as defined in claim 23, wherein the length of said barrier plate is greater than the length of said bottom edges.

31. A system as defined in claim 23, wherein said elongated steel barrier plate has top and bottom surfaces and a thickness therebetween of about 0.125 inch, and wherein each of said recesses has a depth below said top surface of about 0.020 inch and a width of about 0.063 inch.

32. A system as defined in claim 31 wherein said sides of said barrier plate are chamfered.

33. A system as defined in claim 32, wherein said recesses provide for a central portion of said barrier plate to extend upwardly into said base gap from the bottom edges of the rails, said central portion having side edges above and parallel to said bottom edges, and a passage along each of said side edges between said top and bottom surfaces of said barrier plate.

34. A system as defined in claim 33, wherein the length of said barrier plate is greater than the length of said bottom edges, said bottom edges have opposite ends, and each said passage is located along a side edge of said central portion at a location spaced inwardly of a common one of said opposite ends of said bottom edges.

35. A system as defined in claim 23, wherein said recesses provide for a central portion of said barrier plate to extend upwardly into said base gap from the bottom edges of the rails, said central portion having side edges above and parallel to said bottom edges, and a passage along each of said side edges between said top and bottom surfaces of said barrier plate.

36. A system as defined in claim 35, wherein the length of said barrier plate is greater than the length of said bottom edges, said bottom edges have opposite ends, and each said passage is located along a side edge of said central portion at a location spaced inwardly of a common one of said opposite ends of said bottom edges.

37. A system as defined in claim 23, wherein the length of said barrier plates is greater than the length of said bottom edges, said recesses providing for said barrier plate to have sides underlying said bottoms of said bases of said rails, a heat insulating element below and spanning said barrier plate and overlapping said sides of said barrier plate and said bottoms of said bases, and a metal base shoe spanning said heat insulating element and engaging said bottoms of said bases, said base shoe having an upwardly open recess to accommodate said heat insulating element.

38. A system as defined in claim 37, wherein said sides of said barrier plate are chamfered and said heat insulating element includes a center portion engaging under said barrier plate and opposite side portions extending upwardly of said center portion and engaging said bottoms of said rails outwardly of said chamfered sides of said barrier plate.

39. A system as defined in claim 37, wherein said recesses provide for a central portion of said barrier plate to extend upwardly into said base gap from the bottom edges of the rails, said central portion having side edges above and parallel to said bottom edges, and a passage along each of said side edges between said top and bottom surfaces of said barrier plate.

40. A system as defined in claim 39, wherein said bottom edges have opposite ends and each said passage is located along a side edge of said central portion of said barrier plate at a location spaced inwardly of a common one of said opposite ends of said bottom edges.

41. A system as defined in claim 40, wherein said sides of said barrier plate are chamfered.

42. A system as defined in claim 41, wherein said heat insulating element includes a center portion engaging under said barrier plate and opposite side portions extending upwardly of said center portion and engaging said bottoms of said rails outwardly of chamfered sides of said barrier plate.

43. A system as defined in claim 42, wherein said elongated steel barrier plate has top and bottom surfaces and a thickness therebetween of about 0.125 inch, and wherein each of said recesses has a depth below said top surface of about 0.020 inch and a width of about 0.063 inch.

44. A system as defined in claim 43, wherein said barrier plate is formed from low carbon steel and said heat insulating element is formed from a ceramic material.

45. A system as defined in claim 44, including side mold shoes over the laterally opposite ends of said web gap and said head gap, and means for cooling said base shoe and said side mold shoes.

46. A barrier plate for use in gas shielded arc welding steel railroad rails each comprising a base having a bottom, a vertically extending web and an upper head, said rails being longitudinally spaced apart to provide a base gap, web gap and head gap to be filled with steel to join said rails, said bottom of each said base having a laterally extending bottom edge, said edge having a length and said base gap having a width between the bottom edges of the bases of the rails, said barrier plate comprising an elongate steel body having top and bottom surfaces, a length in the direction of said bottom edges, laterally opposite sides providing a width greater than said width of said base gap and a nominal thickness between said surfaces, and said barrier plate including a recess in said upper surface along each of said opposite sides, the recesses opening upwardly and laterally outwardly of the corresponding side to provide a central portion and side edges therealong, said central portion having a width for said central portion to be received in said base gap and for said side edges to underlie portions of the bottoms of the bases of the rails.

47. A barrier plate as defined in claim 46, wherein said steel is a low carbon steel.

48. A barrier plate as defined in claim 46, wherein said elongate body has a thickness of about 0.125 inch.

49. A barrier plate as defined in claim 46 wherein said side edges are chamfered.

50. A barrier plate as defined in claim 46 wherein said recesses have a depth of about 0.020 inch and a width of about 0.063 inch.

51. A barrier plate as defined in claim 46 wherein said elongate body has a length greater than the length of the bottom edges of the bases of said rails.

52. A barrier plate as defined in claim 46, further including a laterally outwardly open passage in each of said opposite sides of said body and between said top and bottom surfaces thereof, each said passage having an inner wall spaced laterally inwardly of the recess extending along the corresponding side of said body.

53. A barrier plate as defined in claim 52, wherein said side edges of said body are chamfered and said inner wall of each passage intersects the corresponding chamfered side edge.

54. A barrier plate as defined in claim 52, wherein said body has opposite ends and each of said passages is spaced inwardly from a common one of said ends.

55. A barrier plate as defined in claim 54, wherein said elongate body has a length greater than the length of the bottom edges of the bases of said rails, said bottom edges having ends spaced inwardly of said common one of said ends of said body, and the passages being spaced from the one end of said body so as to be spaced inwardly of said ends of said bottom edges when said central portion of said barrier plate is received in said base gap.

56. A barrier plate as defined in claim 55, wherein said side edges of said body are chamfered and said inner wall of each passage intersects the corresponding chamfered side edge.

57. A barrier plate as defined in claim 56, wherein said body is formed from a low carbon steel and has a thickness of about 0.125 inch, and said recesses have a depth of about 0.020 inch and a width of about 0.063 inch.

58. A barrier plate as defined in claim 52, wherein said side edges of said body are chamfered and said inner wall of each passage intersects the corresponding chamfered side edge.

59. A barrier plate as defined in claim 58, wherein said recesses have a depth of about 0.020 inch and a width of about 0.063 inch.

60. A barrier plate as defined in claim 59, wherein said passages have a width of about 0.103 inch and a length of about 1.63 inches.

61. A barrier plate as defined in claim 59, wherein said body is formed from low carbon steel.

* * * * *